Figure 1:
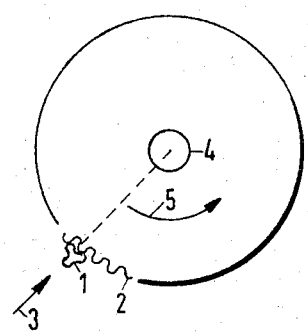

Aug. 22, 1967     W. HOLZER     3,336,814
DRIVE FOR SWITCHING MEANS
Filed Aug. 31, 1964     4 Sheets-Sheet 1

INVENTOR:

WALTER HOLZER

BY Toulmin & Toulmin
ATTORNEYS

Aug. 22, 1967 W. HOLZER 3,336,814
DRIVE FOR SWITCHING MEANS
Filed Aug. 31, 1964 4 Sheets-Sheet 2

INVENTOR:
WALTER HOLZER
BY
Toulmin & Toulmin
ATTORNEYS

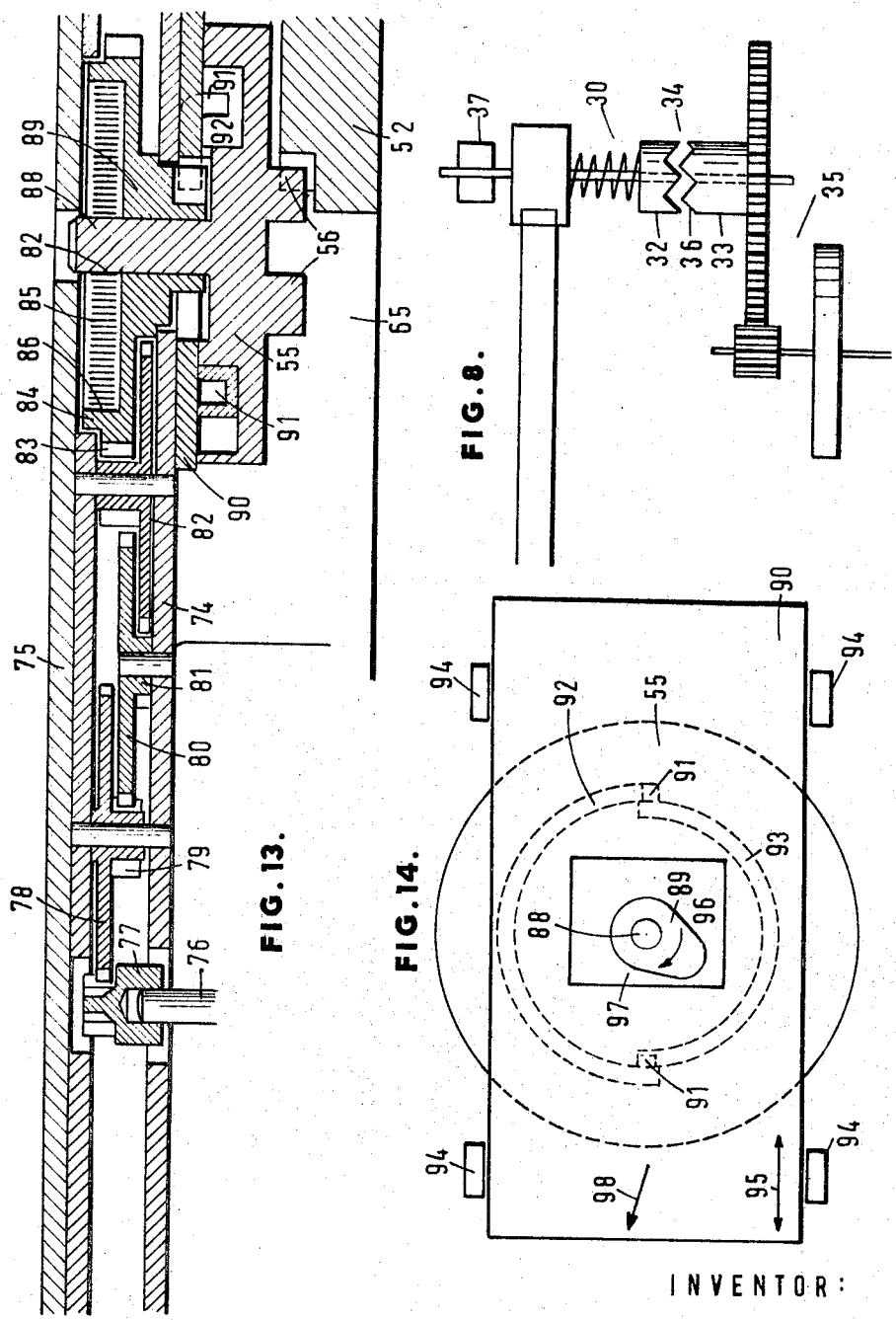

Aug. 22, 1967  W. HOLZER  3,336,814
DRIVE FOR SWITCHING MEANS
Filed Aug. 31, 1964  4 Sheets-Sheet 4

INVENTOR:
WALTER HOLZER

BY Toulmin & Toulmin
ATTORNEYS

United States Patent Office 3,336,814
Patented Aug. 22, 1967

3,336,814
DRIVE FOR SWITCHING MEANS
Walter Holzer, Drosteweg 19, Meersburg
(Bodensee), Germany
Filed Aug. 31, 1964, Ser. No. 393,025
Claims priority, application Germany, Sept. 4, 1963,
H 50,178; Nov. 29, 1963, H 50,980; Apr. 24, 1964,
H 52,479
11 Claims. (Cl. 74—461)

The present invention relates to a drive for switching means, particularly for programme controls and similar devices.

The purpose of the invention is to provide a drive for switching means permitting additional, reliable, manual adjustment as desired.

Switching means with a clockwork drive are known. They are chiefly distinguished by the fact that a friction or overrunning clutch is provided between the direct or indirect drive of the switching means and the switching shaft, which operates contacts for example via cams, so that the shaft may be adjusted by hand by means of a rotary knob.

Most known drives for switching means have the great disadvantage that when turned on by hand there are no catches or only insufficiently active catches to enable the correct switching positions to be exactly located. Faulty connections and possible damage to the contacts then result.

The present invention consequently aims to avoid the disadvantages of known drives for switching means of the above type and to provide an improved drive which, apart from automatic advance of a switching shaft, permits additional hand adjustment and ensures absolutely exact switching positions.

In a drive for switching means, particularly programme controls and similar devices, comprising a switching shaft which is directly or indirectly driven and additionally adjustable by hand and further comprising contacts operated thereby, the problem of the invention is solved in that both the driving and the locking of the switching shaft are effected by a locking element, particularly the pinion, which is mounted on the shaft with a resilient frictional connection to an opposed toothing and which can be disengaged in the course of manual adjustment.

As a result of this feature there is no friction or other clutch provided on the drive for the switching means. Instead the locking element, particularly the pinion, which drives the shaft is pressed off the toothing of the shaft when the switch is manually adjusted. Because of its special design it acts so that, when manually adjusted, the switching means is felt to engage in exact switching positions.

A requirement very frequently made of switching means is that the shaft should be able to move only in a specific rotary direction and should be non-rotatable in the opposite direction. In order to comply with this requirement the invention provides for the toothing between the pinion and the opposed toothing to be asymmetrical, so that manual adjustment can take place only in one direction.

As a result of the asymmetry existing between the toothing on the pinion and the opposed toothing the former blocks manual adjustment of the switch in a specific direction, whereas the switch can be adjusted in the opposite direction while maintaining the locking action of the pinion.

If asymmetrical toothing is undesirable for reasons of specific functional features, blocking for manual adjustment in a specific direction may be effected through mounting the pinion for displacement at an angle to the radial of the opposed toothing.

With this embodiment the pinion is pushed off the toothing on the shaft and allows locking adjustment only when the switch is manually adjusted in a specific direction, whereas when the shaft is rotated in the opposite direction the pinion is drawn towards the axis of the shaft and blocks manual rotation.

If an intermediate gearing has to be provided in order to obtain a larger transmission ratio between the drive and the shaft, the invention provides for the intermediate wheel engaging the pinion to be equipped with the opposed toothing. This wheel may also be in the form of a camplate. Programme controls are in many cases equipped with a number of camplates which are mounted on the shaft and operate a plurality of contacts. In such a case it is possible, and the invention provides for at least one of the camplates to be equipped with toothing opposed to that on the pinion.

Another important feature is that the number of catches is equal to the number of desired switching positions.

This means that each engagement that can be sensed during manual adjustment corresponds to an exact switching position, so that faulty connections such as are possible, for example, in known drives for switching means with a friction clutch are definitely avoided.

The invention also provides for a step-by-step drive to be associated with the pinion, the intervals between the steps being provided at locked positions favourable to locking; the pinion may have two, three, or four teeth.

This important feature of the invention prevents the pinion from having intermediate positions with an unfavourable locking action as may happen in some cases with continuously driven pinions.

In this connection a further feature of the invention is that the pinion is stopped in the position of maximum transmission ratio.

Maximum transmission ratios are obtained according to the invention with the two-, three-, or four-toothed pinions in engagement with the sides of the opposed toothing.

There are cases where it is in fact difficult to stop the locking element abruptly in favourable locking positions. Even if this can be done there is no automatic guarantee that with the locking element in this position the opposed toothing on the shaft will also adopt a position such as is required to give the shaft exact switching positions. Narrow limits in both directions are imposed on the sizes of the locking element with this low number of teeth. Consequently the transmission ratio between the locking element and the shaft cannot be chosen at will and adapted to requirements.

These disadvantages may be avoided by associating advance limiting means with the pinion. With this limitation of the advancing movement of the locking element the shaft, which is driven along the force path, advances in stages and is stopped in exactly defined switching positions opposite the contacts. In addition the transmission ratio between the speeds of the locking element and shaft may be adapted to requirements by mounting the locking element in a suitable place along the force path of the gearing.

In this connection an important feature of the invention is that the locking element is combined with a known bolt spring mechanism.

In order to provide an exactly defined step-by-step advance on a driven element by means of a locking element it was hitherto necessary to arrange the locking element laterally of a toothed wheel on a cam. This greatly extends the mounting space for such an arrangement, which is extremely disadvantageous, particularly in the case of switching arrangements where space is limited. In addition the moved masses on eccentrics of arranged locking pawls cause vibrations in the drive.

The arrangement according to the invention of known bolt spring mechanisms arranged concentrically to the locking element is extremely space saving and simple in construction. Bolt spring mechanisms constitute accumulators in which an equal, exactly defined amount of energy is always stored. This is very important particularly for locking drives, since the locking element must not only overcome spring biases but also always bring about the same advancing movements. Adaptation therefore takes place to the energy balance, the increasing supplied energy in the accumulator being equal to the energy removed from the locking element. To produce the desired effect, it is advantageous for the rotary angles to be directly converted into drive motion, which is not the case in other accumulators, for example with crank discs and deflecting levers. These accumulators also use far more material and are less efficient. Particularly in the case of the step-by-step drives mentioned above with locking pawls moved by eccentrics the advance takes place firstly with positive and then with negative acceleration, whereas in bolt spring mechanisms the advance takes place abruptly, which is particularly advantageous for drives locked by a locking element. In spite of the abrupt advancing movements of the locking element bolt spring mechanisms definitely prevent over shooting, whereas in very rapidly moving pawl drives over shooting of the driven element can be prevented only with expensive complex apparatus.

There are various ways of moving the locking element out of the engaged position during manual adjustment of the shaft. One embodiment of the invention relating to this is characterized in that the opposed toothing and locking element are equipped with oblique toothing and the latter is arranged for displacement axially to the opposed toothing.

In this arrangement the locking element moves axially out of the engaged position when the shaft is manually adjusted. Such an arrangement is extremely space saving and guarantees both certain advance and exact locking positions.

Another possibility provided for by the invention is for the locking element to be designed in the form of a locking roller with at least one gap in the teeth and for it to be mounted for displacement radially to the opposed toothing.

In such a roller cylindrical surfaces interrupted only by the gap in the teeth form the advance limiting means, so that an exactly defined advance is obtained without a bolt spring mechanism, the cylindrical surfaces blocking any further movement of the opposed toothing after the advance.

Another embodiment of the invention is characterized in that the opposed toothing and locking element are in the form of a locking ratchet and provided with symmetrical or asymmetrical toothing.

Such an embodiment of a locking drive is extremely space saving and may be provided anywhere along the force path of a reduction gearing.

A resilient frictional connection is necessary to ensure that the locking element engages the opposed toothing; according to the invention this is done by mechanical or magnetic springing.

In the case of switching means with an exactly defined mounting position the locking element may, according to the invention, be mounted for displacement out of the engaged position against the action of gravity.

A drive of this type for the switching means dispenses with the elastic means for the resilient frictional connection.

If it is desired to advance in stages a disc cam in particular, in which the concentric cam tracks abruptly operate many resilient contact levers, it is necessary for the advancing of the cam to be exact and accurate so that even the smallest rotary movements of the cam are sufficient to abruptly move many contact levers sensing the cam. It is also possible to use a drive with a locking element which, if pressed resiliently against the disc cam, springs into engagement in the toothing thereof and allows the cam to be turned by hand.

The disadvantage of this construction is that the drive for the locking element shares a common base plate with the bearing of the disc cams, and the plate must therefore operate very exactly. If, for example, the sequence of steps in the drive is to be altered it is not possible with this construction readily to fit or replace other drive elements, since the original base plate on which the relative spacing of the various bearings is fixed is still present and difficult constructional alterations are necessary to change the action of the drive even slightly.

These disadvantages can be avoided by using a locking element which, if pressed resiliently against the disc cam, springs into engagement in the toothing thereof and by designing the drive so that it can be made and adjusted separately from the disc cam, so that any common base plate for the cam and the drive does not make it difficult to change the drive conditions.

According to the invention the pinion and its drive are mounted together on a portion of the housing, for example a base plate, which is pivotally fixed to another portion of the housing accommodating the bearing of the disc cam, the resilient frictional connection between the pinion and the shaft being established by a spring which draws the portions of housing together.

In this construction there are only two bearings with a spacing between them that must be exactly maintained, namely the bearing receiving the disc cam and the bearing in which the pivoting shaft for the whole drive is located. As the drive is pressed pivotally and resiliently against the element to be driven the whole drive may be fitted separately. Adjustment is unnecessary. The manufacture of such drives is thereby greatly simplified. It is important that the driving pinion drops in a defined manner into the toothing of the disc cam, so that the cam is moved forward in exactly uniform steps. The rotary movements of the cam are generally very small and these then suffice safely to operate the contact levers sensing the contact tracks on the cam. The contact levers have deliberately not been made in the form of sensing levers to operate snap switches. This would be far too expensive. Nor could very many contact levers be moved adjacent one another or in groups in the very small space on the cam. The new construction in which the driving pinion is made to engage only by a spring enables such an arrangement to be made in a reliable manner.

In an advantageous embodiment the bearing about which one portion of the housing—for example a base plate—pivots is arranged on one side and the bearing for the pinion on the opposite side, the spring engaging between these bearings.

It is also desirable for the drive motor to be fixed interchangeably in the portion of housing, in the vicinity of the pivoting shaft.

There are, so to speak, two portions of housing. One portion accommodates between plates the disc cam which is provided with the contact levers on one side and which may be sensed, for example, by additional contact levers on the other side. The second portion of housing, on which the drive for the disc cam is located is arranged between these plates. The construction is therefore clearly laid out and manufacture and adjustment are easy. The very small amount of space taken up is very important, as is the relative insensitivity to shaking, which is particularly favourable when such drives are used for the programme controls in washing machines.

In a particularly desirable embodiment of the drive the latter is formed by a motor which, acting through a reduction gearing, constantly stretches an accumulator such as a spring which moves the driving pinion step by step by means of a braking mechanism.

An accumulator of this type abruptly advances the driving pinion and thus the disc cam. If it is also desired to allow the cam to be turned by hand in this construction, then it is particularly important that the shaking caused by the abrupt switching should not somehow move the locking element in the toothing of the cam. The construction according to the invention prevents the cam from moving even slightly and thereby reducing switching accuracy.

It is desirable for the latter drive to be mounted so that the pivotable portion of housing is formed by two spaced plates between which are mounted the gearing, the accumulator and the braking mechanism, the drive motor and pinion being located on the outside of the upper plate, one at each end.

With this construction the drive is in the form of a compact structural unit and the two plates may also be surrounded, for example by a housing, from which only the drive motor and pinion project. The drive can then easily be mounted even subsequently on portions of housing or on base plates wherever the pinion is required to engage abruptly in toothing so as to move the associated portion in a circle or in a straight line. It must also be possible to bring the pinion out of engagement by manual turning.

Figure 2:
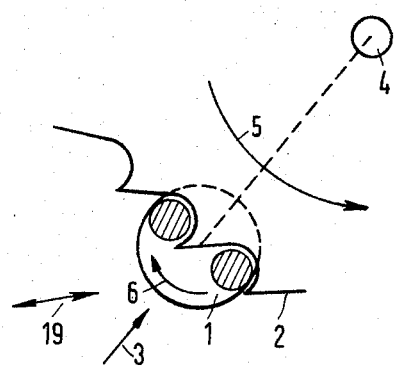
Figure 3:
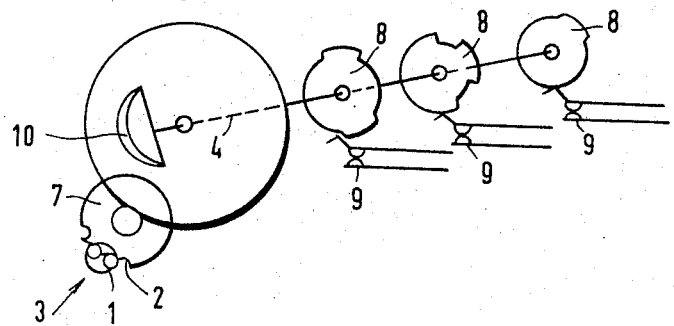
Figure 4:
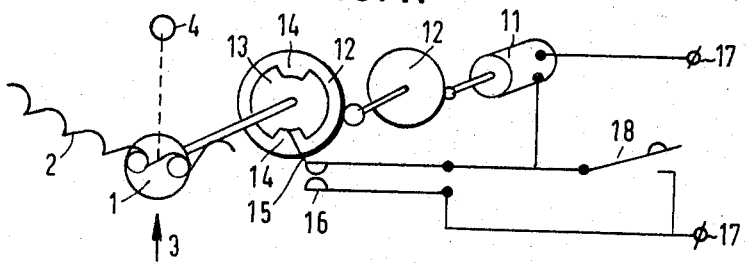
Figure 5:
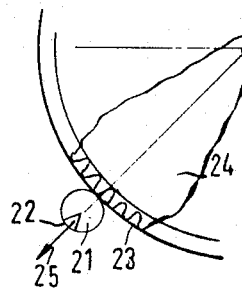
Figure 6:
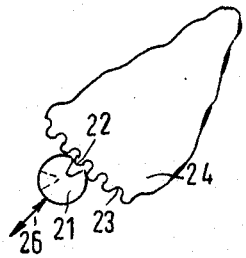
Figure 7:
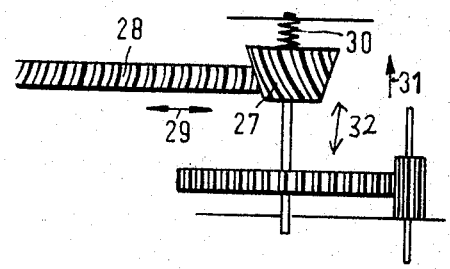
Figure 9:
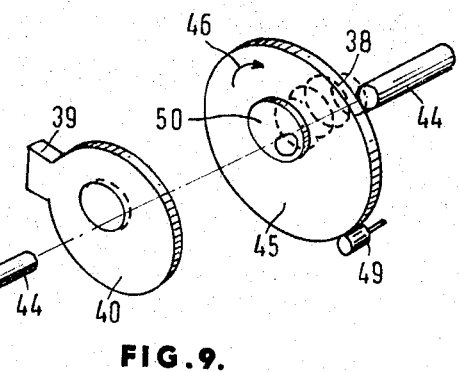
Figure 10:
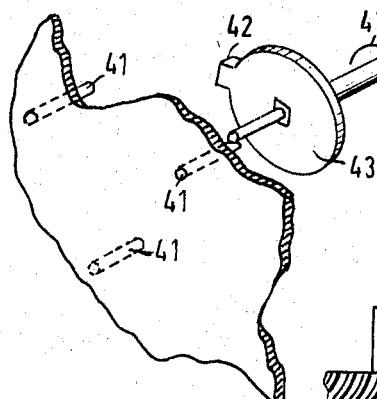
Figure 11:
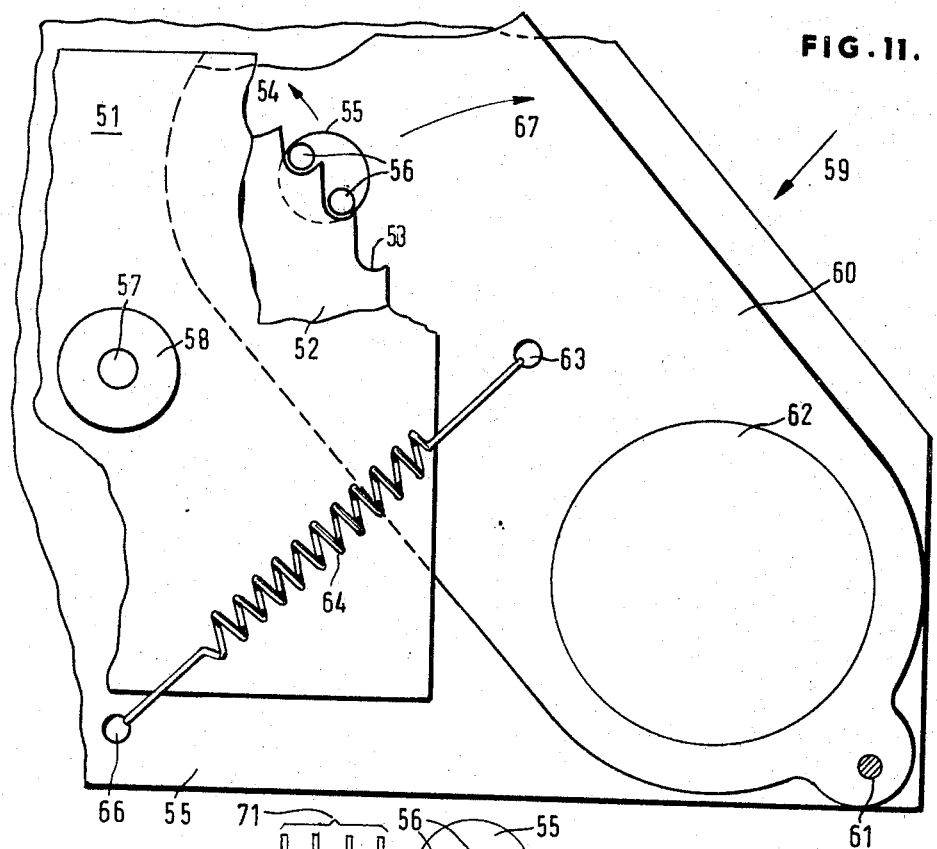
Figure 12:
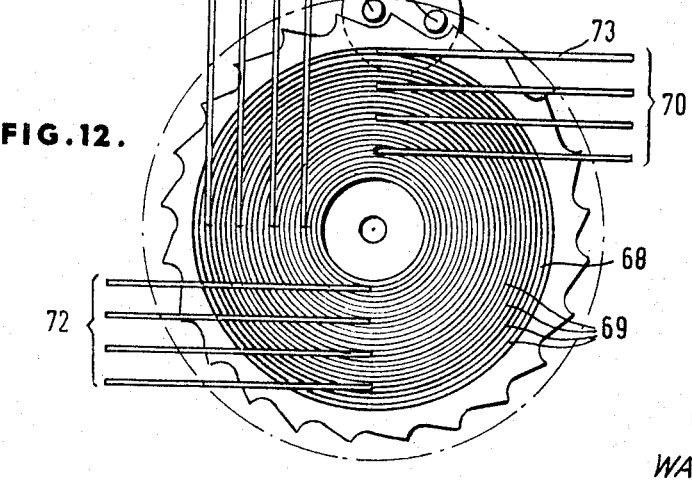

For a better understanding of the invention reference is made to the accompanying drawings. The various figures show different embodiments of drives for switching means designed according to the invention. Further features of the invention will become apparent from the various figures and the explanations thereof. In the drawings:

FIG. 1 is a diagram showing the principle of the drive according to the invention, FIG. 2 shows the arrangement of a double toothed pinion on an asymmetrical opposed toothing, FIG. 3 shows a drive according to the invention with an intermediate gear between the pinion and the switching shaft, FIG. 4 shows a possible embodiment of the drive with the pinion advanced in stages, FIG. 5 shows a locking element in the form of a roller in a position blocking an opposed toothing, FIG. 6 shows the FIG. 5 roller during the advance of an opposed toothing, FIG. 7 shows an axially displaceable locking element in the form of a bevel gear, FIG. 8 shows a locking ratchet in the force path of a reduction gearing, FIG. 9 shows the structural element of a known bolt spring mechanism, FIG. 10 diagrammatically shows the arrangement of a bolt spring mechanism as in FIG. 9 on a locked drive as in FIG. 7, FIG. 11 diagrammatically illustrates the arrangement of the pivotable drive for driving a disc cam with asymmetrical toothing, FIG. 12 shows a possible construction of the driven disc cam in FIG. 11, the driving pinion being shown in engagement with the toothing on the cam and FIG. 13 shows a possible construction for the drive, which is arranged between two plates. FIG. 14 is a plan view, illustrating diagrammatically the operation of the disc cam.

FIG. 1 shows the pinion 1 which has, for example, three teeth and which is in engagement with the opposed toothing 2 on the switching shaft 4. The pinion 1 is mounted for displacement in the direction of the radial of the opposed toothing at the point of engagement and is held in a resilient frictional connection to the toothing 2 by resilient means (not shown in the figures) in the direction of the arrow 3. It can be clearly seen from FIG. 1 that the arrangement according to the invention makes it possible for the shaft 4 to be turned manually, for example in the direction of the arrow 5; against the pressure of the resilient means the pinion 1 yields resiliently in the opposite direction to the arrow 3 and causes the toothing 2 and consequently the shaft 4 to be locked in a manner than can be felt. In this embodiment it is also possible to turn the shaft 4 manually in the opposite direction to the arrow 5; the pinion 1 then exerts the same locking action as when the shaft 4 is turned manually in the direction of the arrow 5.

FIG. 2 shows a preferred embodiment of a pinion 1 having two teeth in the form of casters or cylindrical pins of circular section which engage asymmetrical opposed toothing 2. Because of the asymmetrical design of the toothing 2 the shaft 4 can be turned manually only in the direction of the arrow 5, manual adjustment in the opposite direction being blocked. If the toothing 2 is asymmetrical the pinion 1 is urged in a resilient frictional connection against the toothing 2 by resilient means (not shown) in the direction of the arrow 3, i.e. in the direction of the opposed toothing radial of the point of engagement, shown by the broken line. It makes yielding movements both when the shaft 4 is manually adjusted in the direction of the arrow 5 and when it is itself rotated by the drive in the direction of the arrow 6 against the pressure of the resilient means in the opposite direction of the arrow 3. Manual adjustment in the opposite direction to the arrow 5 may be blocked if the opposed toothing 2 is symmetrical. In such a case the pinion 1 is mounted for displacement not in the direction of the radial of the opposed toothing but at an angle thereto, for example in the directions of the double arrow 19, and is urged by the resilient means against the symmetrical toothing 2. With such an arrangement even if the toothing 2 is symmetrical the shaft 4 is obviously prevented from being turned manually in the direction of the arrow 5, whereas when it is rotated in the opposite direction the pinion 1 is urged outwards by the toothing 2.

FIG. 3 shows a modified embodiment of a switching means according to the invention in which an intermediate gearing 7 is arranged between the pinion 1 and the shaft 4; the intermediate wheel thereof engaging the pinion 1 is equipped with opposed toothing 2. FIG. 3 also showing switching cams 8 mounted on the shaft 4; these operate contacts 9 and may be manually adjusted by means of the rotary knob 10 on the shaft 4.

FIG. 4 shows another modified embodiment of the drive according to the invention for switching means, wherein the pinion 1 is driven step by step. The step by step drive comprises a motor 11 which by means of intermediate wheels 12 drives a cam 13 rotating together with the pinion 1. The cam 13 contains recesses 14, preferably equal in number to the teeth on the pinion 1. It operates contacts 15, 16 which are located in the circuit of the motor 11 with the poles 17 of the voltage source and which are bridged by a normally open key switch 18. By brief actuation of the switch 18 the circuit of the motor 11 is closed. Acting through the intermediate wheels 12 the motor drives the cam 13, whereby the contacts 15, 16 are closed and the key 18 may be freed. In the illustrated embodiment of the cam 13 with two recesses 14 the contacts 15, 16 are opened and the motor circuit broken after half a revolution of the cam, so that the pinion 1 is stopped after every half revolution. It will be seen that the pinion 1 in FIG. 4 is the same as the pinion 1 in FIG. 2 except that it has two roller shaped teeth, since conditions for locking and engaging the drive are best when the number of teeth is extremely low. This also reduces the production costs for the drive.

FIG. 4 shows clearly that the illustrated position of the pinion 1 results in a particularly favourable locking action. It is therefore desirable to arrange the recesses 14 in the cam 13 so that the circuit of the motor 11 is broken each time the pinion 1 reaches the position illustrated. Small tolerances in the positions of the pinion as it stops will have only a negligible influence on the position of the shaft 4. The tolerances are compensated for through the pinion 1 having two teeth; this is known to result in non-uniform rotation of the driven opposed toothing and thus reaches the maximum transmission ratio, for example, in the FIG. 4 position where the velocity of the driven toothing 2 is zero. Stopping of the pinion 1 in the FIG. 4 position is greatly helped by the double toothed design of the pinion, since the opposed torque counteracting the fly wheel effect of the pinion drive reaches a maximum in this position.

In FIG. 5 the locking element is in the form of a locking roller 21 with a tooth space 22. It is pressed by resilient means (not shown) against the opposed toothing 23 of any gear 24 in the force path of a reduction gearing (not shown). In FIG. 5 the roller 21 is shown in the locking position in which it yields in the direction of the arrow 25 against spring pressure when the gear 24 is manually adjusted. The cylindrical surfaces of the roller 21 form advance limiting means, in that they prevent the gear 24 from moving on and also exert a locking action on the teeth 23.

FIG. 6 shows the locking roller 21 in a position in which it is urged against the opposed toothing 23 in the direction of the arrow 26 by spring action.

It will be seen from FIGS. 5 and 6 that the step by step advance of the gear 24 is restricted exactly to the width of one tooth even if as the roller 21 is moved on step by step it is not abruptly stopped immediately after advancing but instead continues as a result of the fly wheel effect to a position of the tooth space 22 indicated in broken lines in FIG. 2, since the cylindrical surfaces form advance limiting means. A locking element of this type in the form of a roller is extremely cheap to produce and can co-operate with any opposed toothing; an exactly defined step by step advance is always guaranteed.

FIG. 7 shows an adapted embodiment of a locked drive in which the locking element, in the form an obliquely toothed bevel gear 27, is mounted anywhere along the force path of a reduction gearing for displacement axially to an obliquely toothed intermediate wheel 28. This arrangement provides for manual adjustment of the wheel 28 in the direction of the arrow 29; the bevel wheel 27 is moved out of the position of engagement in the direction of the arrow 31 against the action of a spring 30 and after manual adjustment re-engages the intermediate wheel 28 in the opposite direction and produces a locking action.

FIG. 8 shows an adapted embodiment of a locking drive according to the invention in which the locking element forms the axially displaceable member 32 of a locking ratchet 34 and the opposed toothing forms the non-displaceable member 33 thereof, the ratchet 34 also being mounted anywhere along the force path of a reduction gearing 35. The toothing 36 of the ratchet may be either symmetrical or asymmetrical, depending on whether manual adjustment of the driven element 37—during which the axially displaceable member 32 of the ratchet 34 yields axially against the pressure of the springs 30—is to be blocked in one direction or not.

FIG. 9 shows a known bolt spring mechanism which may be arranged according to the invention as an advance limiting means and which has an accumulator in the form of the spring 38. During accumulation the abutment lug 39 of a spring plate 40 is applied to one of the stationary abutments 41, and maintains the abutment angle 42 of the plate 43 mounted non-rotatably on the spring shaft 44. When the gear 45 has rotated through a given angle in the direction of the arrow 46 relatively to the blocked spring shaft 44 the cam 50 moves the spring plate 40 and thus its abutment lug 39 sufficiently far out of the locked position relatively to the stop 41 for the lug 39 to be freed and for the spring shaft 44 with the plate 43 to be abruptly moved in the direction of the arrow 47 by the spring 38, which is now relieved. Because of this movement the tension of the plate 40 with the cam 50 slackens so that the lug 39 has a greater radial spacing from the shaft 44 and strikes the next stationary abutment 41. In this way the lug 39 is stopped together with the plate 43 and spring shaft 44, whereupon the process is constantly repeated in the manner described above.

The combination of such a bolt spring mechanism with a locking drive according to the invention results in abrupt exactly limited advancing movements with constant energy corresponding to the constant energy accumulated. The mechanism is extremely space saving and can be provided anywhere along the force path of a gearing where a drive locked according to the invention is to be fitted.

FIG. 10 shows such an arrangement of a bolt spring mechanism 48 on a locked drive according to FIG. 7, with its bevel gears 27 mounted on the spring shaft 44 for axial movement against the pressure of the spring 30. Depending on how many abutments 41 are provided for the plate 40 different, exactly restricted advancing paths for the intermediate wheel 28 may be produced, although the gear 45 is uniformly driven by a gearing pinion 49. A bolt spring mechanism 48 may of course also be mounted on locked drives as in FIGS. 5, 6 and 8 and on all known locked drives if exactly limited advancing paths are required.

FIG. 11 shows the portion of disc cam 52 projecting from the cover 51. The cam has asymmetrical toothing 53, for example at the periphery, so that when rotated by hand, movement is possible only in the drive direction 54. The drive itself is provided by the pinion 55 on which are mounted two locking pins 56, for example offset from one another by 180°. As many locking pins as desired may of course be used if the toothing is designed accordingly. The shaft 57 of the disc cam 52 is rotatably mounted in the bearing 58. The drive 59 is formed by a portion 60 of housing pivoting about the shaft 61. The drive motor 62 is fixed in the portion of housing as shown diagrammatically. The spring 64 engages the point of attachment 63 between the motor 62 and the pinion 55, the other side of the spring being connected to the housing member 65 by the fastening pin 66. When the disc cam 52 is turned by hand the drive pinion 55 is forced out of the toothing 53 in the direction of the arrow 77 against the spring 64.

FIG. 12 shows a disc cam as may be used in FIG. 11. In this embodiment concentric cam tracks 69 are provided on a disc 68. The tracks move contact levers 73 arranged in groups 70, 71, 72. As the contact levers are resilient they load the disc 68 unevenly in the example shown in FIG. 12. If the tracks 69 are very close to one another and the contact levers of the upright type a very large number of levers may be actuated even if the rotation of the disc 18 is very slight. Thus it is necessary for the adopted position to be maintained at each switching step without the disc 58 over shooting or retreating, and for the next position to be reached abruptly so as to avoid any creeping contact making and burning of the contacts. Of course it is also possible to provide contacts on the underside of the disc 68 and/or to make the contact levers co-operate with a printed circuit.

FIG. 13 is a sectional view of a drive with a pinion 55 such as could be accommodated in the housing member 60. An upper and a lower plate 74, 75 are provided. The drive motor 62 and pinion 55 project from the outside of the upper plate 74. As shown diagrammatically, the disc cam 52 is joined to the other housing member 65 by its bearing 58 (not shown). The motor shaft 76 is further provided with the pressed-on pinion 77. Pinion 77 drives the spur wheel 78, and the pinion 79 thereof in turn engages in the spur wheel 80. The wheel 80 has a pinion 81 engaging in the spur wheel 82. Finally the wheel 82 has a pinion 83 which engages in a spur wheel 84. All the wheels have their bearings in the upper and lower plate. The spur wheel 84 has an internal aperture to receive the flat band tension spring 85. The external end 86 of the spring is joined to the spur wheel 84 and the internal end 87 to the shaft 88 of the pinion 55. The drive pinion 55 in turn has locking pins 56 which engage in the toothing of the disc cam. The spur wheel 84 is continued in an eccentric cam 89. Both the spur wheel 84 and the eccentric cam 89 are mounted on the shaft 88 for free rotation, for example by means of a hollow shaft. The cam 59 moves a slide 90 until the abutments 91 thereof, by entering the concentric apertures 42, allow the pinion 55 to be abruptly rotated by the accumulator formed by the flat band tension spring 85.

FIG. 14 shows the mode of operation, diagrammatically and in a plan view of the disc cam (omitting the locking pins 56 and other details). It will be seen that the slide 90 is mounted between guides 94. It moves to and fro in the direction of the arrow 95 when the cam 89 rotates in the direction of the arrow 96 within the aperture 97 in the slide. The abutments 91 are fixed to the slide 90. In the position shown the abutments 91 prevent the pinion 55 from also being moved in the direction 96 by the spring or energy store. Only when the abutments 91 are moved far enough in the direction of the arrow 98 to enter the apertures 92 and 93 respectively does the drive pinion 55 abruptly swing round to 180°. The eccentric 96, which is constantly and uniformly rotated by a motor (not shown), then assigns the opposite position to the abutments 91. The accompanying shaking and blows cannot have any effect on the engagement of the locking pins 56 in the toothing 53 of the disc cam, since the mass to be moved by this brief shaking is too large to permit displacement or jolting.

Instead of the above preferred method of driving the pinion by means of an accumulator and braking mechanism any other drives could be used, provided that they switch abruptly. If they cause shaking this must not be allowed adversely to affect the position of the driven switching member, for example a disc cam, in any way.

Although the description and drawings are concerned substantially with the possibility of using the drive according to the invention for programme controls and similar devices, it should be remembered that the illustrations must be considered only as possible examples and that applications of the drive according to the invention offer themselves wherever the possibility of manual adjustment with exact locking is desired apart from a motor drive. For this reason it will not be going beyond the scope of the following claims if, for example, alterations of the illustrated arrangements and embodiments such as suggest themselves to an expert are carried out in harmony with the inventive idea.

Thus it will be quite understandable to an expert that the reference to the reduction gearing was made only because switching means are normally driven by a rapidly running motor. Similarly it is quite possible without going beyond the following claims for the locking drive according to the invention to be provided on stepping-up gearings, particularly in combination with a bolt spring mechanism known per se, if the switching means is driven, for example, by spring force or manually. The displacement of the locking element out of the position of engagement, which occurs on manual adjustment, may obviously be suitably exploited as a switching movement, for example for disconnecting the drive motor.

What is claimed is:
1. A drive for switching means comprising:
a switching shaft assembly operable to a plurality of switching positions and being adapted to operate a plurality of electrical contacts;
said switching shaft assembly including a switching shaft mounted for rotation about a first axis and having a toothing mounted thereon for rotation therewith;
a pinion mounted for rotation about a second axis in generally parallel spaced relationship to said switching shaft and for displacement with respect to said switching shaft;
said pinion being urged against said toothing by resilient means;
said switching shaft assembly being manually positionable to said plurality of switching positions;
said pinion and said resilient means being cooperable to engage said pinion with said toothing and thereby drive said switching shaft assembly to said plurality of switching positions and to positively position said switching shaft assembly in each of said plurality of switching positions when said switching shaft assembly is driven by said pinion and when manually positioned.

2. The invention according to claim 1 wherein said toothing is asymmetrical to that manual positioning of said switching shaft assembly is restricted to one rotational direction.

3. The invention according to claim 1 wherein said pinion is mounted for displacement with respect to said switching shaft at an angle to the radial of said toothing so that manual positioning of said switching shaft assembly is restricted to one rotational direction.

4. The invention according to claim 1 wherein the number of teeth of said toothing is equal to the number of switching positions to which said switching shaft assembly is operable.

5. The invention according to claim 1 further comprising a step by step drive means coupled to said pinion, said drive means adapted to bring said pinion to rest between steps at positions which encourage engagement of said pinion with said toothing.

6. The invention according to claim 1 wherein said pinion is in the form of a cylinder having one tooth space.

7. The invention according to claim 1 wherein said resilient means includes at least one mechanical spring.

8. The invention according to claim 1 further comprising a housing, pinion drive means and a base plate for mounting said pinion and said pinion drive means, said base plate being pivotally mounted to said housing at a first point remote from said pinion, and wherein said resilient means includes a spring tensioned between said base plate and said housing, said switching shaft being rotatably mounted to said housing.

9. The invention according to claim 8 wherein said spring is coupled to said base plate at a point intermediate said first point and said pinion.

10. The invention according to claim 8 wherein said pinion drive means includes an accumulator and a braking means, said accumulator and said braking means being cooperable to move said pinion in stages to said switching positions.

11. The invention according to claim 8 further comprising a cover plate affixed to said base plate in spaced parallel relationship thereto and being pivotable therewith, and wherein said pinion drive means includes a drive motor mounted to said cover plate, all of said pinion drive means except said drive motor being located intermediate said base plate and said cover plate, and said pinion extending through said cover plate to engage said toothing.

References Cited

UNITED STATES PATENTS

| | | | |
|---|---|---|---|
| 284,290 | 9/1883 | Gilliland | 74—461 |
| 2,509,639 | 5/1950 | Harker et al. | 74—461 X |
| 2,985,028 | 5/1961 | Napolin et al. | 74—461 X |

FRED C. MATTERN, Jr., *Primary Examiner.*

DAVID J. WILLIAMOWSKY, *Examiner.*

C. J. HUSAR, *Assistant Examiner.*